March 21, 1933.    R. A. TRUE    1,902,049
LIQUID METER
Filed May 28, 1932    3 Sheets-Sheet 1

R. A. True
INVENTOR

By: Marks & Clerk
Attys.

March 21, 1933.  R. A. TRUE  1,902,049
LIQUID METER
Filed May 28, 1932  3 Sheets-Sheet 2

R. A. True
inventor

By Marks & Clerk
Attys.

March 21, 1933.  R. A. TRUE  1,902,049
LIQUID METER
Filed May 28, 1932  3 Sheets-Sheet 3
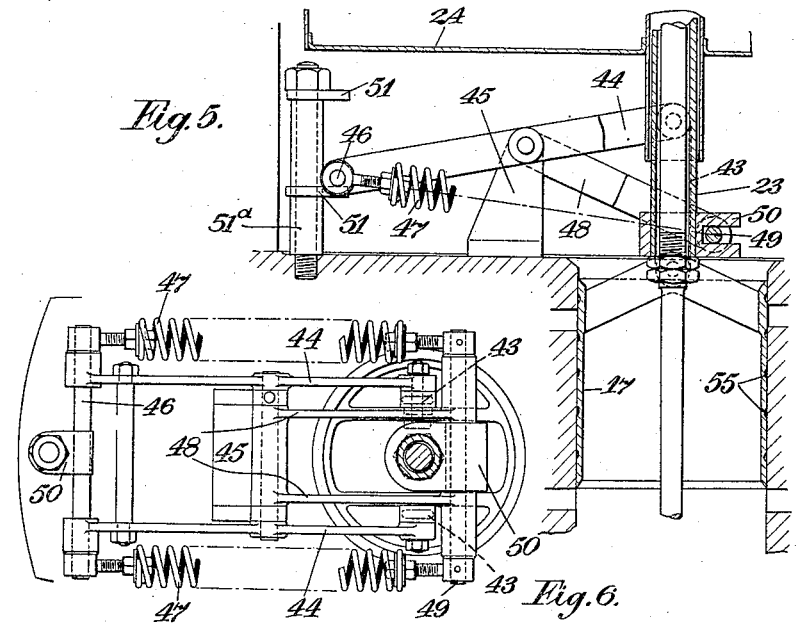
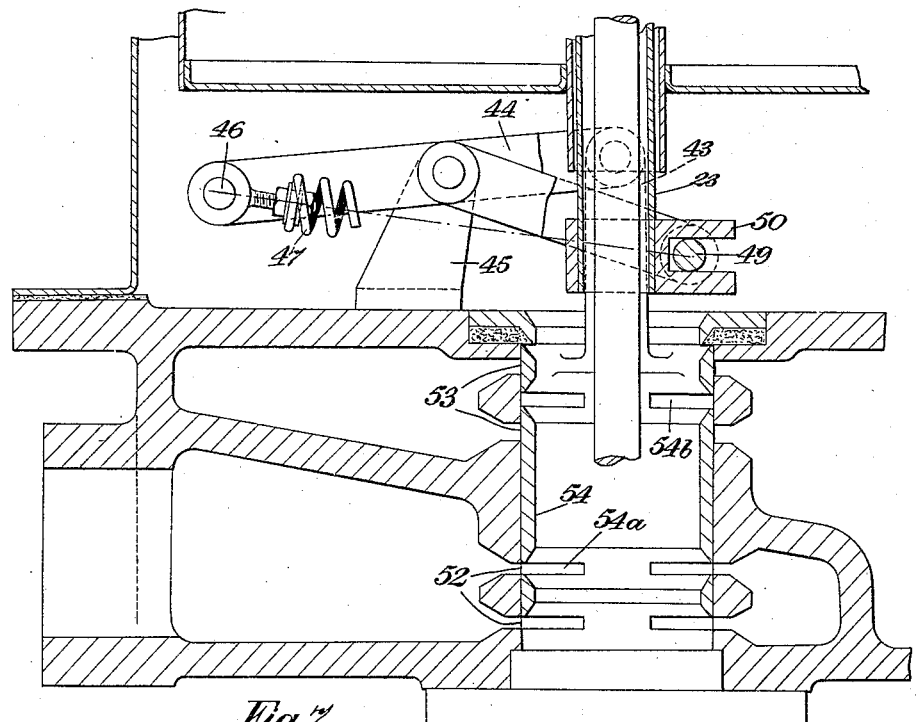
R. A. True
INVENTOR
By: Marks & Clerk
Attys.

Patented Mar. 21, 1933

1,902,049

UNITED STATES PATENT OFFICE

ROBERT ARTHUR TRUE, OF PETERBOROUGH, ENGLAND

LIQUID METER

Application filed May 28, 1932, Serial No. 614,244, and in Great Britain April 21, 1931.

I have filed an application in Great Britain, April 21, 1931, application No. 11,806.

This invention relates to liquid meters for automatically measuring the volume of liquid flowing from a source of supply to a reservoir tank or to the apparatus using the liquid, such as a carburetor for an internal combustion engine, oil fired furnace and the like.

More particularly the invention relates to the type of liquid meter in which the liquid flows through a measuring chamber having a float which is adapted to rise and fall with the level of the liquid in such chamber and control the operation of snap action means which effect wholly or in part the opening and closing of inlet and outlet ports and consequently the flow of the liquid into the chamber and discharge therefrom.

An object of the invention is to provide an improved form of meter of the type described, in which the valve element or elements controlling the inlet and outlet ports will function efficiently irrespective of the pressure thereon due to the head or pressure of liquid on the supply side.

The invention consists in a liquid meter of the type described comprising a measuring chamber having a float adapted to rise and fall with the level of liquid therein, inlet and outlet ports for said chamber, sleeve valve means controlling such ports and operatively connected to the float and snap action means for actuating the valve means to open and close the ports.

The valve means according to the invention may comprise a single sleeve valve having inlet and outlet ports adapted to register with ports in a valve casing.

The initial movement of the valve means may be effected by the float, the final movement being effected by the snap action means.

Alternatively, the whole of the movement of the valve may be effected by the snap action means.

Further features of the invention will be hereinafter described.

In the accompanying drawings:—

Figures 5 and 6 are partial elevation and plan of a further form of mechanism for giving the snap action movement to the valve.

Figure 7 is a partial elevation of mechanism similar to that shown in Figure 6 but having a modified form of valve.

Figure 1:
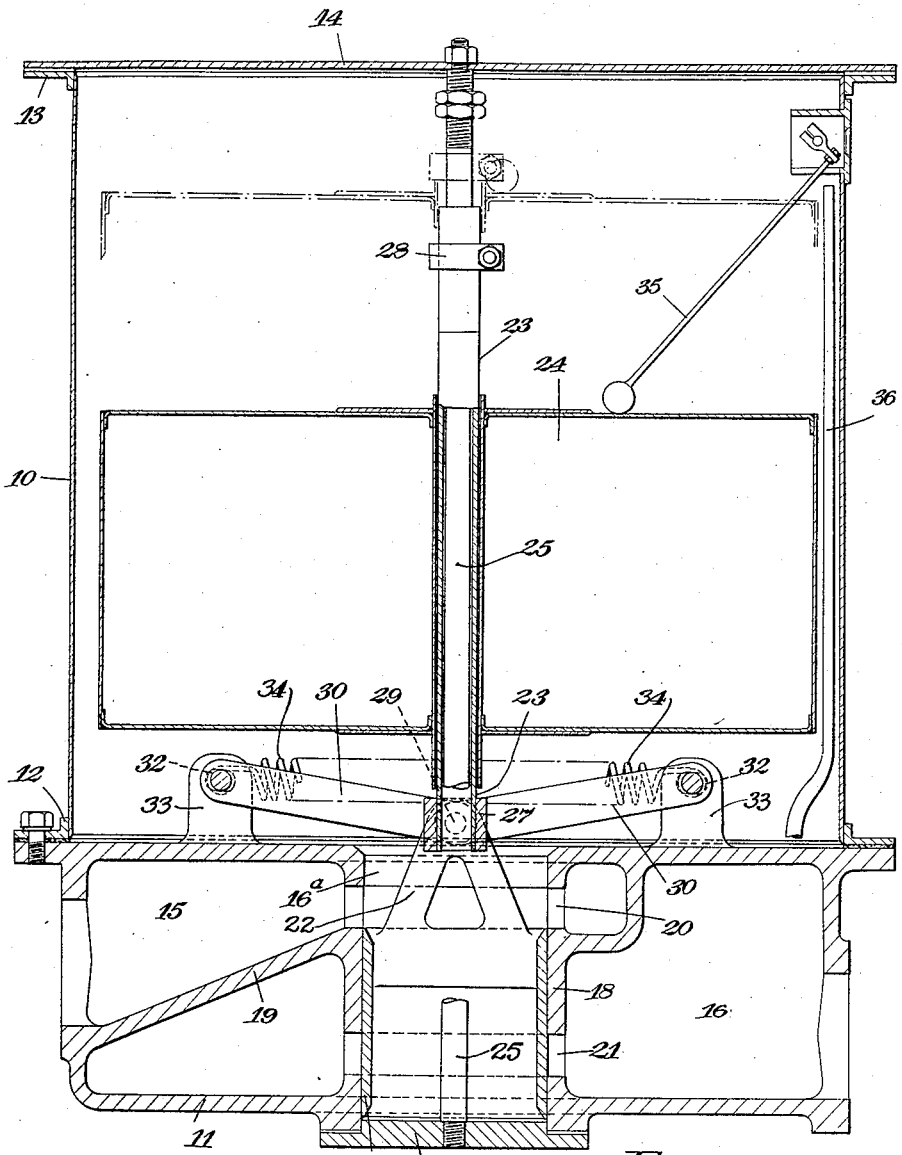
Figure 1 is a sectional elevation and Figure 2 a partial plan of a meter according to the invention.

In carrying the invention into effect according to one convenient mode (see Figures 1 and 2) a cylindrical float chamber 10 is provided and mounted above a valve casing 11. The float chamber may comprise a cylinder, which may be of transparent material, the ends of which are located within a pair of flanged rings 12, 13, the lower ring 12 being bolted to the valve casing 11, while the upper ring 13 is connected to a disc 14 which forms a closure for the upper end of the float chamber.

The valve casing is provided with inlet and outlet chambers 15, 16, the inlet chamber 15 communicating with the float chamber by a central aperture 16a which is controlled by a valve 17 so that liquid may flow into the float chamber 10 or, when the valve is in the appropriate position, through the valve and into the outlet chamber 16. The valve 17 comprises a single sleeve member which seats within a central cylindrical seating 18 formed in three parts; an intermediate part which is mounted upon a diaphragm 19 dividing the valve casing into the inlet and discharge chambers, and upper and lower parts or seats formed respectively in the upper and lower walls of the valve casing. By this arrangement inlet and outlet ports 20, 21 are provided in the valve seating and comprising either complete or lantern rings which are formed between the upper and middle seating portions and the middle and lower seating portions respectively.

These ports are adapted to be controlled by the upper and lower ends of the sleeve valve 17 or the valve may be provided with ports in its wall. The valve is adapted to be moved along a vertical axis and is provided with upwardly extending arms 22 which are connected to a sleeve or tubular rod 23 which passes through a float 24. This sleeve or tubular rod 23 is freely guided by means of a central rod 25 which connects the upper closing disc 14 of the float chamber to a lower cap or closure 26 which closes the lower end of the valve seating and thus holds the parts in position.

The tubular rod 23 is provided at its lower end with a collar 27 and at its upper end with an adjustable abutment 28 with which the float is adapted respectively to engage when it falls or rises with the fall or rise of liquid in the float chamber. The collar 27 is provided with laterally extending pins 29 by which it is pivotally connected to the inner ends of pairs of toggle links 30 and also to the valve arms 22. The outer ends of the links 30 are provided with lateral pins 31 sliding in horizontal slots 32 in posts 33 mounted upon the valve casing 11 and projecting within the float chamber. The pins 31 on the ends of the toggle links are connected by tension springs 34 whereby, when the links are moved to a position approaching dead centre, the tension is increased, while when the dead centre position is passed, the springs cause a rapid movement of the toggle links 30 and consequently rapid action of the sleeve valve.

Figure 2:
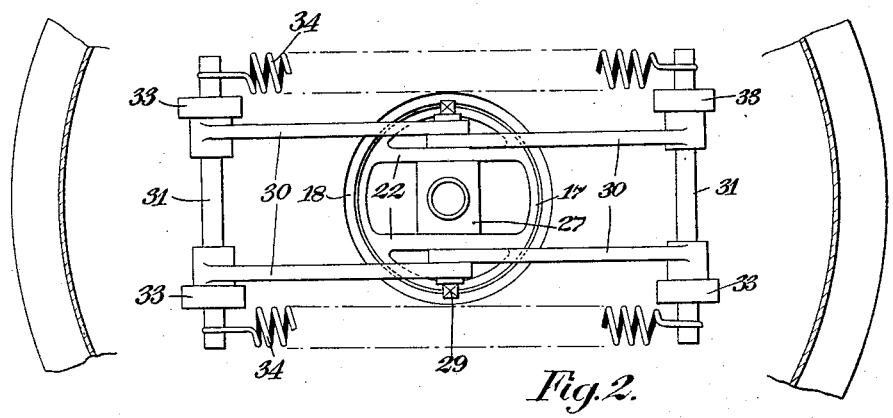

In operation, assuming the float chamber to be empty, with the sleeve valve in its corresponding lowest position, as indicated in Figure 1, closing the outlet or discharge port 21, liquid will flow through the inlet port 20 and into the float chamber, causing the float to rise until it engages the abutment 28 on the tubular rod 23. Continued rise of the liquid and consequent upward movement of the float will lift the tubular rod and also raise the valve and thus partly close the inlet port. At the same time the springs 34 will be stretched and this will continue until the centre pin 29 of the toggle passes over the dead centre, when the springs will cause a rapid movement of the valve to complete the closing of the inlet port 20 and the opening of the outlet port 21.

The measured quantity of liquid will then flow from the float chamber and out through the outlet port, the float then falling until it engages the collar 27 on the lower end of the tubular rod. The weight of the float is arranged so that at this position of the parts the float will move the tubular rod downwardly causing a partial closing of the outlet port until the centre pin 29 of the toggle is again across the dead centre when the springs will cause a rapid movement of the valve completely to close the outlet port 21 and open the inlet port 20.

The rising and falling movement of the float may be communicated to a counting mechanism by a suitably pivoted lever 35 engaging the upper surface of the float, or such counter may be operated by the movements of the tubular rod.

In order to take care of the displacement of air in the float chamber, an air pipe 36 is provided which extends to the upper part of the chamber and communicates with the discharge side 16 of the valve casing. Such air pipe is also desirable where a pump is provided connected to the discharge side of the meter in such a way as to produce a vacuum in the float or measuring chamber and thereby cause fluid to be drawn into such chamber through the inlet valve.

Figure 3:
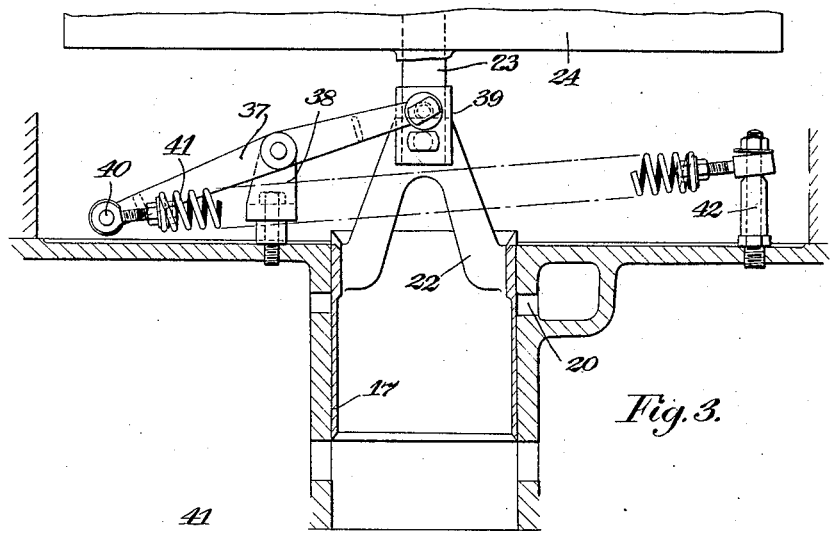
Figures 3 and 4 are partial elevation and plan of a modified arrangement of the mechanism for producing the snap action.
Figure 4:
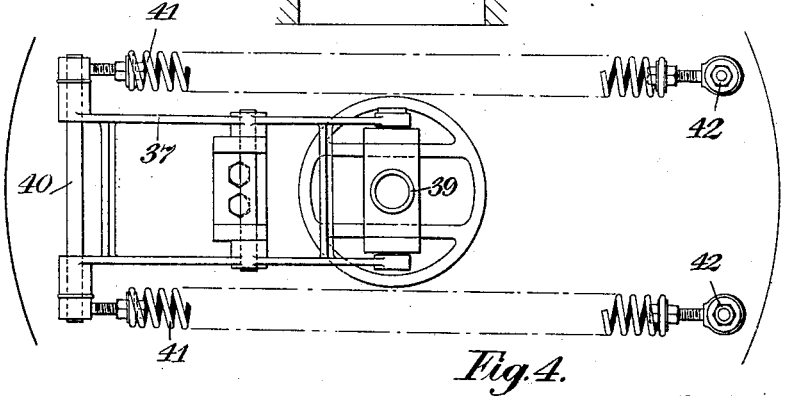

According to a modified form (see Figures 3 and 4), instead of the toggle links a pivoted lever (or levers) or a framework 37 comprising a pair of spaced levers connected by suitable cross pieces, may be provided which is fulcrumed medially upon a fixed bracket 38, one arm (or arms) of the framework being coupled to lateral pins on the collar 39 which latter is fixed to the tubular rod 23 and coupled with the valve arms 22, the other arm (or arms) carrying a spindle 40 to which an end of each of a pair of tension springs 41 is connected, the other ends of the springs being connected to fixed pillars 42 mounted on the base of the apparatus on the other side of the valve. The point of connection of the springs 41 with the pillars 42 is so disposed with respect to the axis of the lever 37 that as the latter moves from one position past its center, the springs snap the lever over into its other position. A lost motion connection is provided between the lever 37 and the lateral pins of the collar 39 so as to permit the valve to move in a linear path.

It will be appreciated that in consequence of the closing of the inlet port further rise of the float is prevented, but the continued movement of the valve to open the delivery port is effected by the tension of the springs.

According to a further form (see Figures 5 and 6) the valve 17 is connected by links 43 to the adjacent ends of a pair of spaced levers 44 which are fulcrumed about midway of their length on a stationary bracket 45. The other arms of the levers extend beyond the fulcrum and carry a pin or spindle 46 to which adjacent ends of a pair of springs 47 are attached. On the same bracket 45 a pair of links or frame 48 is pivoted, the other ends of the links or frame carrying a rod or spindle 49 adapted to ride in a slot formed in a collar 50 attached to the lower end of the tubular rod 23 with which the float 24 is associated. The rod 49 carried by this pair of links 48 is extended laterally and the ends are adapted to be engaged by the other ends of the tension springs 47.

With this arrangement the movement of the float 24 causes a pivoting of the links or frames 48 associated with the tubular rod 23 and moves them either upwardly or downwardly as the case may be, until the centre line of the springs 47 passes across the fulcrum or pivotal axis of the bracket 45 when the tension of the springs causes a snap action of the mechanism and thus raises or lowers the valve as the case may be.

The pin or spindle 46 carried by the outer ends of the fulcrumed levers 44 is adapted to ride between a pair of stops 51, whereby the extent of movement of the valve in one direction or the other may be terminated. These stops 51 are adjustable and spaced apart to the desired extent, whereby the desired regulation of movement of the valve may be effected. Adjustment of the stops 51 may be effected by substituting spacing members 51a of the proper length.

With this form of mechanism it is possible to give a lap to the valve so that there is a time lag between the closing of one port and the opening of the other.

In the form of meter shown in Figure 7 in which the valve actuating mechanism is similar to that described with reference to Figure 5, the inlet and outlet ports 52 and 53 are duplicated and the valve 54 suitably lanterned by the provision of ports 54a and 54b therein.

By such a construction an increased port area is provided in relation to the valve stroke and consequently greater speed of action, or conversely a reduced valve stroke in relation to the port area conseqently a considerable reduction in spring effort is required without reducing the speed of action.

It may be desirable to provide the wall of the valve or the seating surface thereof with circumferential grooves (55 as indicated in Figure 5) to avoid leakage of liquid past the valve.

Having now described my invention, what I claim as new and desire to secure by Letters Patent is:—

1. A liquid meter of the type set forth comprising a measuring chamber, a float therein adapted to rise and fall with the level of liquid in the chamber, said chamber having inlet and outlet ports, a single sleeve valve controlling said ports and snap action means for actuating the valve to open and close said ports, said valve and snap action means being operatively connected to the float.

2. A liquid meter of the type set forth comprising a measuring chamber, a float therein adapted to rise and fall with the level of liquid in the chamber, said chamber having inlet and outlet ports, a sleeve valve member operatively connected to the float for controlling said ports, the initial movement of the valve being effected by the float, and snap action means operatively connected to the float for effecting the final movement of the valve to open and close the ports.

3. A liquid meter of the type set forth comprising a measuring chamber, a float therein adapted to rise and fall with the level of liquid in the chamber, said chamber having inlet and outlet ports, a sleeve valve operatively connected to the float for controlling said ports, and snap action means operatively connected to the float and adapted to effect the whole movement of the valve to open and close said ports.

4. A liquid meter of the type set forth comprising a measuring chamber, a float therein adapted to rise and fall with the level of liquid in the chamber, said chamber having inlet and outlet ports, a sleeve valve member controlling said ports and operatively connected to the float, and snap action means operatively connected to the float for actuating the valve, said means comprising toggle levers adapted to be moved from a dead centre position by a spring the tensioning of which is effected by the float.

5. A liquid meter of the type set forth comprising a measuring chamber having inlet and outlet ports, a displaceable sleeve in said chamber, a pair of spaced abutments carried by the sleeve, a float guided on the sleeve and adapted to rise and fall with the level of liquid in the chamber, a sleeve valve member controlling said ports and connected to the sleeve, and a pair of toggle levers, the adjacent ends of which are connected to one of the abutments, and a spring connecting the outer ends of the levers, and means for guiding said ends transversely to the movement of the float.

6. A liquid meter of the type set forth comprising a measuring chamber having inlet and outlet ports, a displaceable sleeve in said chamber, a pair of spaced abutments carried by the sleeve, a float guided on the sleeve and adapted to rise and fall with the level of liquid in the chamber, a sleeve valve member controlling said ports and connected to the sleeve, a pivoted lever framework connected at one end to one abutment, and tension springs connected to the other end of the framework and to a fixed point.

7. A liquid meter of the type set forth comprising a measuring chamber having inlet and outlet ports, a displaceable sleeve in said chamber, a pair of spaced abutments carried by the sleeve, a float guided on the sleeve and adapted to rise and fall with the level of liquid in the chamber, a sleeve valve member controlling said ports and connected to the sleeve, a pivoted lever, a link pivotally connecting one end of said lever to said valve, a tension spring one end of which is connected to the opposite end of said lever, and a link connected to the other end of the spring and by a sliding connection to one of the abutments.

8. A liquid meter as claimed in claim 7 characterized by the provision of adjustable stops, the end of the lever connected to the tension spring being movable between said adjustable stops whereby the stroke of the valve may be regulated.

9. A liquid meter as claimed in claim 1 characterized by the provision of a ported valve seating, the valve being formed with duplicated inlet and outlet ports adapted to register with corresponding ports in said valve seating.

10. A liquid meter as claimed in claim 1 wherein the face of the valve is provided with circumferential grooves for the purposes set forth.

11. A liquid meter as claimed in claim 5 characterized by the provision of a valve seating, the float chamber being mounted above said valve seating, a closure plate for said chamber, and a closure for the valve seating, and a rod extending between said closures and holding the parts in position, said rod extending through and guiding the displaceable sleeve.

12. A liquid meter of the type set forth comprising a measuring chamber, a valve casing having inlet and outlet chambers, inlet and outlet ports connecting said chambers with the measuring chamber, a sleeve valve controlling said ports, a float located in the measuring chamber and adapted to rise and fall with the level of liquid therein, an air pipe extending from the outlet chamber into the measuring chamber, and snap action means for actuating the valve, said valve and snap action means being operatively connected to the float.

In testimony whereof I have signed my name to this specification.

ROBERT ARTHUR TRUE.